US010933827B2

(12) United States Patent
Hosaka

(10) Patent No.: US 10,933,827 B2
(45) Date of Patent: Mar. 2, 2021

(54) DUCT

(71) Applicant: INOAC CORPORATION, Nagoya (JP)

(72) Inventor: Koichi Hosaka, Anjo (JP)

(73) Assignee: INOAC CORPORATION, Nagoya (JP)

( * ) Notice: Subject to any disclaimer, the term of this patent is extended or adjusted under 35 U.S.C. 154(b) by 0 days.

(21) Appl. No.: 16/444,415

(22) Filed: Jun. 18, 2019

(65) Prior Publication Data

US 2020/0010039 A1     Jan. 9, 2020

(30) Foreign Application Priority Data

Jul. 3, 2018    (JP) .............................. JP2018-126984

(51) Int. Cl.
*B60K 1/00*      (2006.01)
*B60R 19/48*    (2006.01)
*B60K 11/08*    (2006.01)

(52) U.S. Cl.
CPC .............. *B60R 19/48* (2013.01); *B60K 11/08* (2013.01); *B60R 2019/486* (2013.01)

(58) Field of Classification Search
CPC ... B60R 19/48; B60R 16/04; B60R 2019/486; B60K 11/08
See application file for complete search history.

(56) References Cited

U.S. PATENT DOCUMENTS

| | | | |
|---|---|---|---|
| 6,416,116 B1* | 7/2002 | Stanton | B60H 1/00371 105/461 |
| 8,960,351 B1* | 2/2015 | Maeda | B60R 16/04 180/68.5 |
| 9,328,703 B2* | 5/2016 | Shimozato | F02M 35/162 |
| 2007/0295706 A1* | 12/2007 | Brun | B60H 1/2225 219/202 |
| 2009/0178879 A1* | 7/2009 | Park | F02M 35/1211 181/224 |
| 2012/0192395 A1* | 8/2012 | Lummitsch | B60H 1/34 29/272 |
| 2015/0094647 A1* | 4/2015 | Kalghatgi | A61B 18/042 604/23 |
| 2016/0059468 A1* | 3/2016 | Khami | F02M 35/10334 96/147 |
| 2017/0203632 A1* | 7/2017 | Westendarp | B60H 1/00542 |
| 2018/0154739 A1 | 6/2018 | Khan et al. | |

FOREIGN PATENT DOCUMENTS

| | | |
|---|---|---|
| EP | 2 826 658 A1 | 1/2015 |
| JP | 2-34317 U | 3/1990 |
| JP | 2007-331521 A | 12/2007 |
| WO | 2013/045773 A1 | 4/2013 |

OTHER PUBLICATIONS

Communication dated Dec. 4, 2019, issued by the European Patent Office in counterpart European Application No. 19183823.4.

* cited by examiner

*Primary Examiner* — Hau V Phan
(74) *Attorney, Agent, or Firm* — Sughrue Mion, PLLC

(57) ABSTRACT

A duct 20 includes: wall portions 24, each of which defines a corresponding one face of an air flow path 22 leading air from an air inlet 20a to an air outlet 20b; and groove portions 26, which are provided on at least two of the wall portions 24, 24, respectively, and extend so as to cross an air flow direction of the air flow path 22, and the groove portions 26 are independent from each other for every wall portion 24, and have a concave shape so as to thin the wall portions 24.

4 Claims, 8 Drawing Sheets

DUCT

TECHNICAL FIELD

The present invention relates to a duct installed in vehicle.

CROSS REFERENCES TO RELATED APPLICATIONS

This application is based on Japanese Patent Application (No. 2018-126984) filed on Jul. 3, 2018, the contents of which are incorporated herein by reference.

BACKGROUND ART

Some vehicles include an oil cooler duct disposed between an opening portion provided to a front grill or a bumper at front edge of the vehicle and an oil cooler installed inside the vehicle, so as to lead the air, which is taken in from the opening portion during vehicle travelling, to the oil cooler through the oil cooler duct (e.g., see JP-UM-A-2-34317). Thus, a heat exchange with air is performed in the oil cooler to cool vehicle equipment such as a transmission.

SUMMARY OF INVENTION

Technical Problem

Oil cooler duct is designed to possess stiffness to prevent breakage or an unusual noise due to vibrations generated during vehicle travelling. However, measures to reduce impacts on persons at a collision of human as much as possible are required even in a oil cooler duct in a vehicle.

The present invention has been made in view of the above problems caused by conventional techniques and has an object to suitably solve these problems, and to provide a duct having a pedestrian safety, while maintaining a required stiffness.

Solution to Problem

In order to overcome the above problems and achieve the intended object, according to the present invention, the gist of the present invention is set forth below.

(1) A duct installed in a vehicle, the duct comprising:
  wall portions, each of which defines a corresponding one face of an air flow path leading air from an air inlet to an air outlet; and
  groove portions, provided on at least two of the wall portions, respectively, and extending so as to cross an air flow direction of the air flow path, in which the at least two of the wall portions are continuous with each other,
  wherein the groove portions are independent from each other for every wall portion, and have a concave shape so as to thin the wall portions.

(2) The duct according to the item (1) above, wherein the groove portions provided on different faces of the wall portions are shifted from each other in the air flow direction.

(3) The duct according to the item (1) or (2) above, which further comprises a rib on the wall portion, wherein the rib is provided closer to the air inlet than the groove portions and extends so as to cross the groove portions.

(4) The duct according to any one of the items (1) to (3) above,
  wherein the air outlet that opens toward the rear of the vehicle is shifted in a right/left direction or an up/down direction of the vehicle with respect to the air inlet that opens toward the front of the vehicle, and
  wherein the groove portions are provided on the wall portions other than the wall portion that defines the face opposed to the air inlet.

Advantage of the Invention

According to the duct relating to the present invention, when an external force is applied to the duct, the wall portions can deform at the groove portions to absorb the impact, and thus the duct can exhibit a proper pedestrian safety, while maintaining a required stiffness.

DESCRIPTION OF EMBODIMENTS

Hereinafter, referring to drawings, embodiments of a duct according to the present invention will be described.

Embodiments

Figure 1:
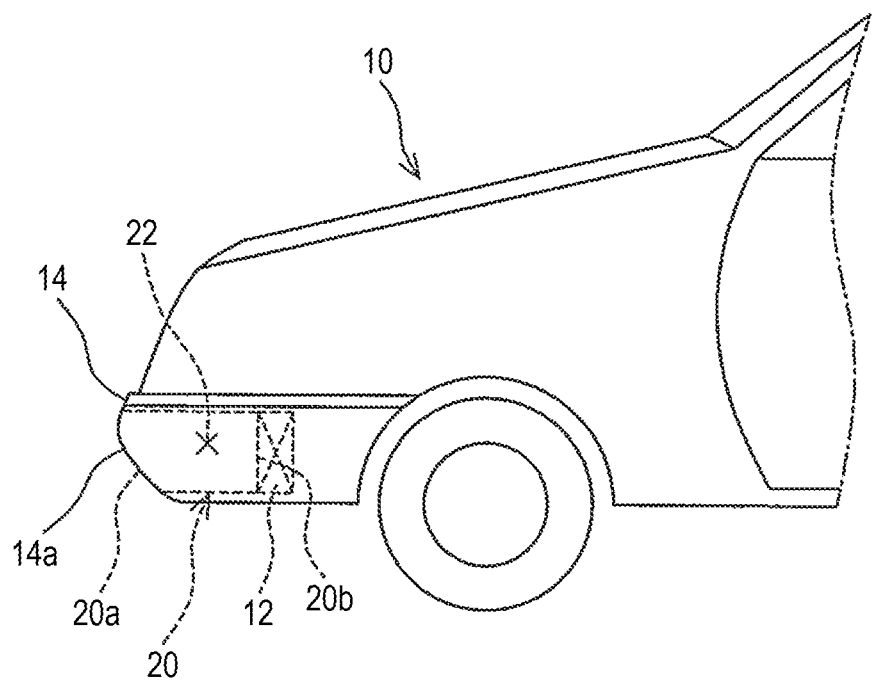
FIG. 1 is an explanatory view showing the installation position for a duct according to an embodiment of the present invention.

As shown in FIG. 1, a duct 20 according to an embodiment is one called an oil cooler duct that leads air for cooling to an oil cooler 12 for cooling a transmission (not shown) in a vehicle 10. The duct 20 is installed between an opening portion 14a provided to a bumper or a grill installed at a front 14 of the vehicle 10 and the oil cooler 12 disposed at the rear of the opening portion 14a. The duct 20 according to the embodiment is disposed at a position leftward in the vehicle front portion. The duct 20 is configured to guide the air, which flows in from the opening portion 14a during vehicle travelling, from an air inlet 20a adjusted to the opening portion 14a to an air outlet 20b via an air flow path 22, and to discharge the air into the oil cooler 12 opposed to the air outlet 20b. The duct 20 is mounted on the body of the vehicle 10 with a mounting piece 23 installed in the air outlet 20b, and is fixed to the vehicle body on the side of the air outlet 20b. The duct 20 is made from a synthetic resin such as polypropylene (PP), and is a molded product obtained by injection molding or the like. It is to be noted that in the following explanation, the front, rear, top, bottom, right, and left of the duct 20 are denoted with respect to the attitudes where the duct 20 is mounted to the vehicle 10.

Figure 2:
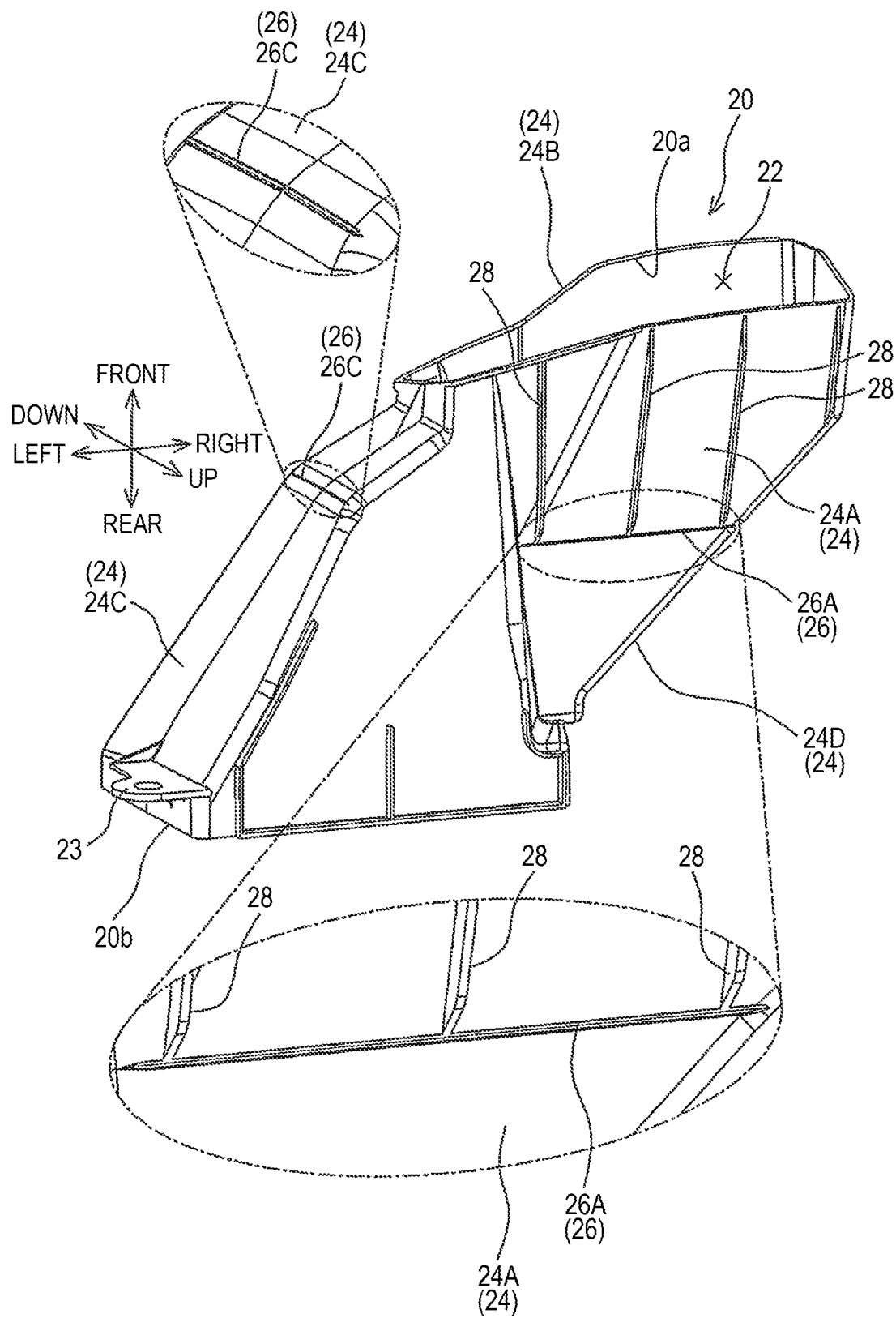
FIG. 2 is a schematic perspective view of the duct according to the embodiment seen from obliquely upward left.
Figure 3:
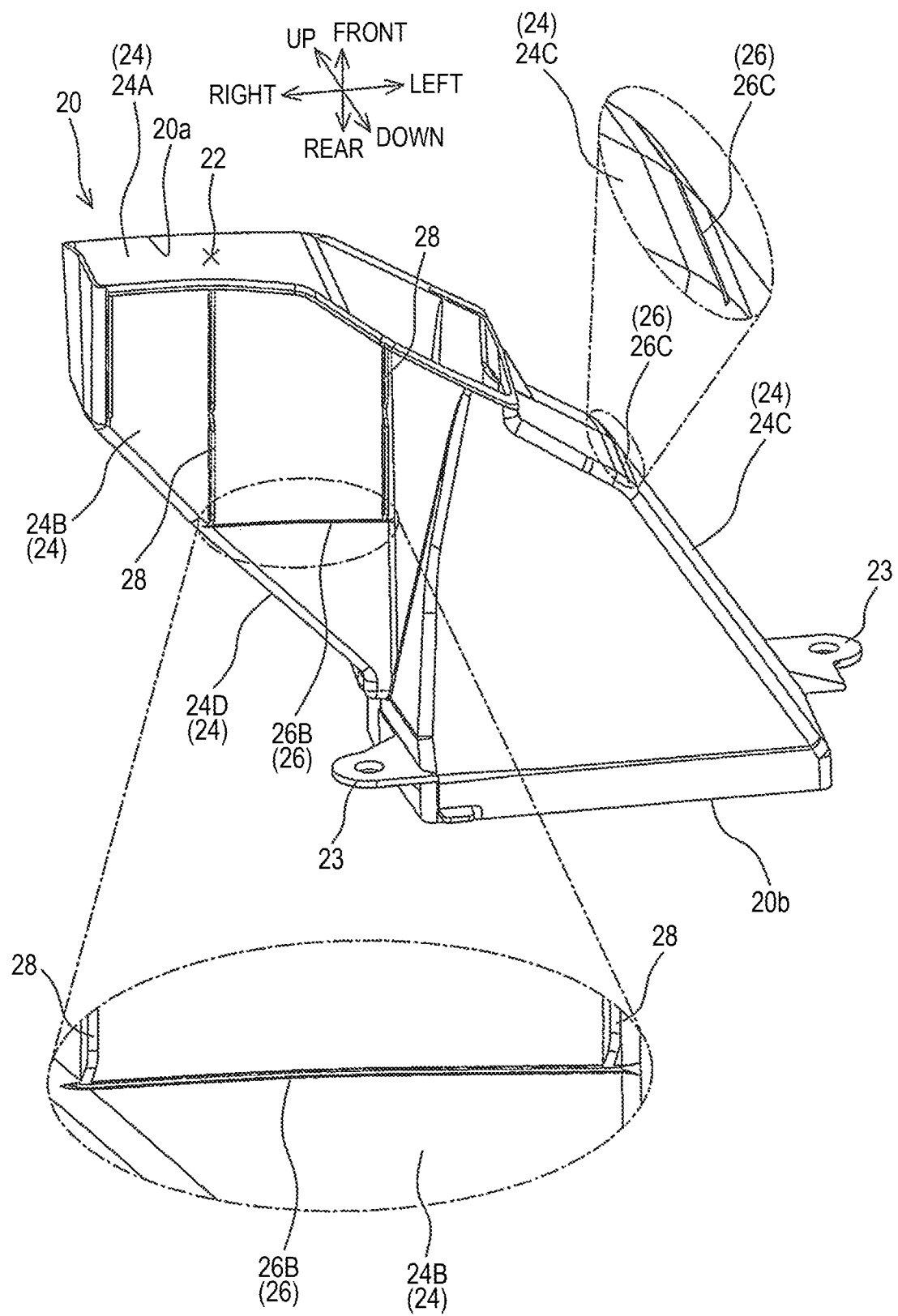
FIG. 3 is a schematic perspective view of the duct according to the embodiment seen from obliquely downward left.
Figure 4:
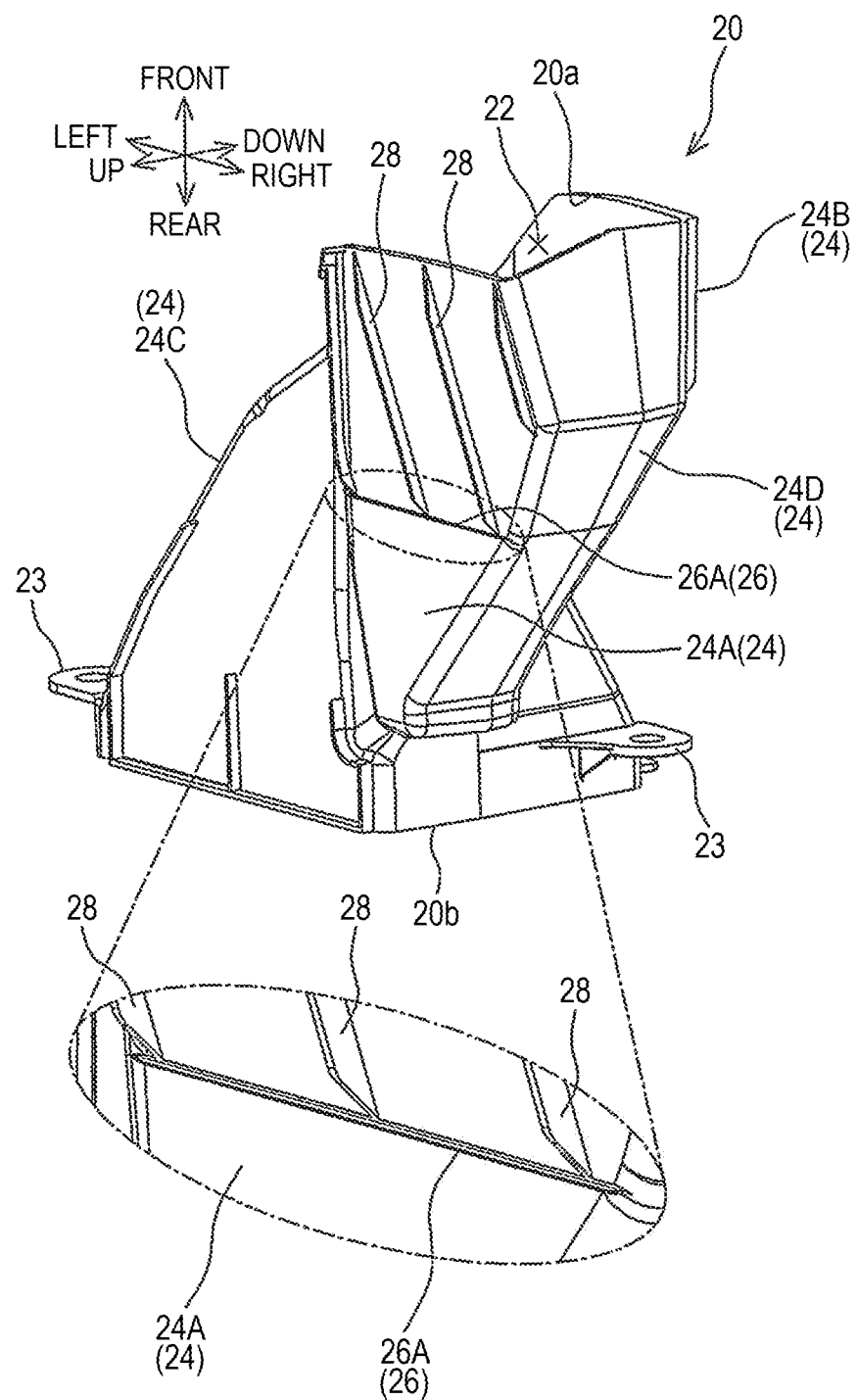
FIG. 4 is a schematic perspective view of the duct according to the embodiment seen from obliquely upward right.

As shown in FIG. 2 to FIG. 4, the duct 20 has a cylindrical shape, and includes wall portions 24 that define corresponding upper, lower, right, and left faces of the air flow path 22 that guides air from the air inlet 20a to the air outlet 20b. The duct 20 according to the embodiment has a flat rectangular cylindrical shape that is wider in the right/left direction than in the up/down direction. Among the four faces of the wall portions 24 in the duct 20, the face defining the upper face of the duct 20 is referred to as an upper wall portion 24A, and the face opposed to the upper wall portion 24A and defining the lower face of the duct 20 is referred to as a lower wall portion 24B. Among the four faces of the wall portions 24 in the duct 20, the face of which the upper edge is continuous with the left edge of the upper wall portion 24A, of which the lower edge is continuous with the left edge of the lower wall portion 24B, and which defines the left face of the duct 20, is referred to as a left wall portion 24C. In the duct 20, the face of which the upper edge is continuous with the right edge of the upper wall portion 24A, of which the lower edge is continuous with the right edge of the lower wall portion 24B, and which defines the right face of the duct 20, is referred to as a right wall portion 24D. In the duct 20, the air inlet 20a opens frontward while the air outlet 20b opens rearward, and the air outlet 20b is shifted with respect to the air inlet 20a in the right/left direction (embodiment) or the up/down direction. In the embodiment, taking it into consideration that the opening portion 14a is disposed closer to the center in the right/left direction at a left side portion of the vehicle 10, and the oil cooler 12 is disposed closer to the vehicle left edge, the duct 20 is formed so that the air flow path 22 tilts more leftward as the air flow path 22 goes from the front side to the rear side. The duct 20 extends so that the left wall portion 24C and the right wall portion 24D tilt more leftward as they go from the front side to the rear side, and the right wall portion 24D is disposed such that the right wall portion 24D is opposed to the air inlet 20a.

As shown in FIG. 2 to FIG. 7, the duet 20 includes groove portions 26, which are provided on at least two of the wall portions 24, respectively, and extend so as to cross the air flow direction of the air flow path 22, in which the at least two of the wall portions 24 are continuous with each other. The groove portion 26 is provided on each of at least two faces which are continuous with each other, such as the upper wall portion 24A and the left wall portion 24C, or the lower wall portion 24B and the left wall portion 24C, and in the embodiment, the groove portion 26 is provided on each of the three faces of the upper wall portion 24A, the lower wall portion 24B and the left wall portion 24C. Thus, the groove portion 26 is provided on the wall portions 24A, 24B and 24C other than the right wall portion 24D defining a face opposed to the air inlet 20a while a groove portion 26 is not provided on the right wall portion 24D. The upper groove portion 26A provided on the upper wall portion 24A and the lower groove portion 26B provided on the lower wall portion 24B extend in the right/left direction so as to cross the air flow direction that tilts more leftward as going from the front side to the rear side (see FIG. 5 and FIG. 7). In addition, the left groove portion 26C provided on the left wall portion 24C extends in the up/down direction so as to cross the air flow direction (see FIG. 6). The groove portions 26 are provided to the duct 20 such that the wall portions 24A, 24B, and 24C can deforme by input of an external force from the side of the air inlet 20a.

As shown in FIG. 2 to FIG. 6, the groove portions 26 are independent from each other for every wall portion 24. In the duct 20, the upper groove portion 26A on the upper wall portion 24A is not connected with the left groove portion 26C on the left wall portion 24C that is continuous with the upper wall portion 24A (see FIG. 2), and in a similar fashion, the lower groove portion 26B on the lower wall portion 24B is not connected with the left groove portion 26C on the left wall portion 24C that is continuous with the lower wall portion 24B (see FIG. 3). The upper groove portion 26A has a shorter dimension in the right/left direction than the upper wall portion 24A, extends leftward from the right edge of the upper wall portion 24A, and is disposed at a position overlapping with the rear portion of the air inlet 20a (see FIG. 5). As indicated by the chain double-dashed line in FIG. 5, the lower groove portion 26B is nearly lined up with the upper groove portion 26A at their right edges while having a shorter dimension than the upper groove portion 26A. The lower groove portion 26B has a shorter dimension in the right/left direction than the lower wall portion 24B, extends leftward from the right edge of the lower wall portion 24B, and is disposed at a position overlapping with the rear portion of the air inlet 20a (see FIG. 7). The left groove portion 26C has a shorter dimension in the up/down direction than the left wall portion 24C, and extends over a large part between the upper edge and the lower edge of the left wall portion 24C while being slightly discontinued at its center portion (see FIG. 6). The left wall portion 24C is formed so as to have its angle changed on its way tilting leftward from the front side to the rear side, such that the bend portion becomes convex, and the left groove portion 26C is provided on the bend portion.

Figure 5:
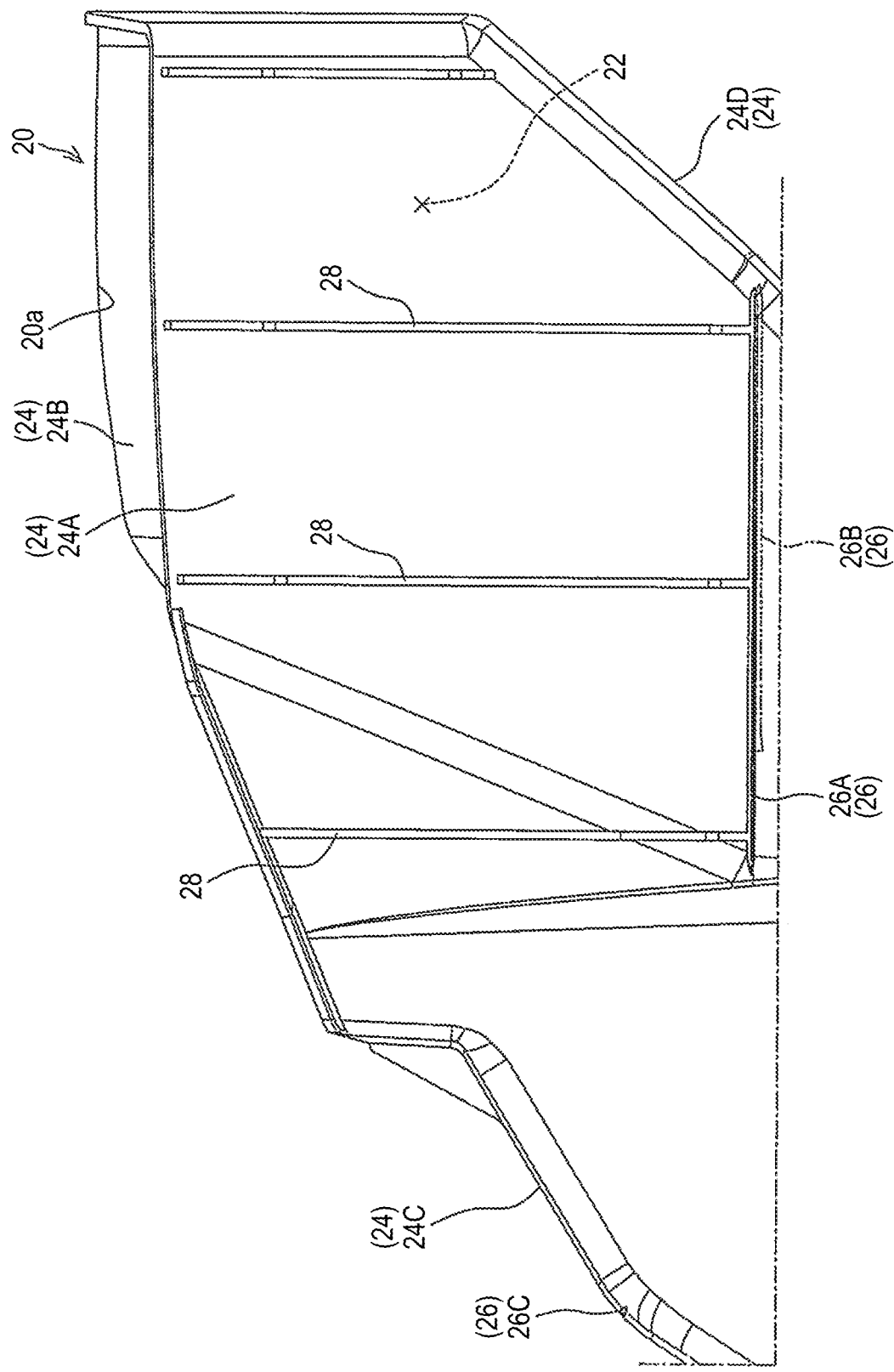
FIG. 5 is a top view of the duct according to the embodiment.
Figure 6:
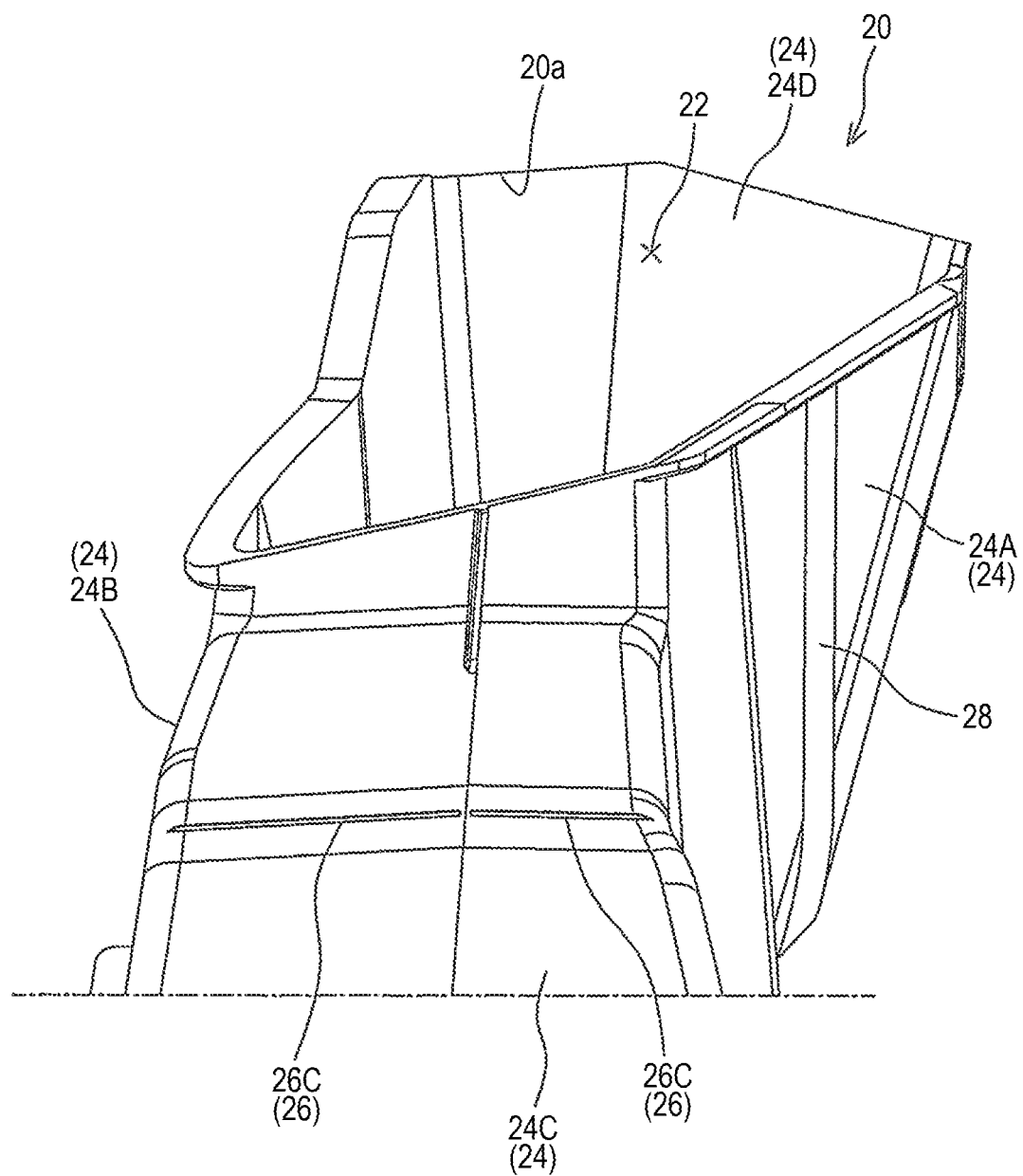
FIG. 6 is a left side view of the duct according to the embodiment.
Figure 7:
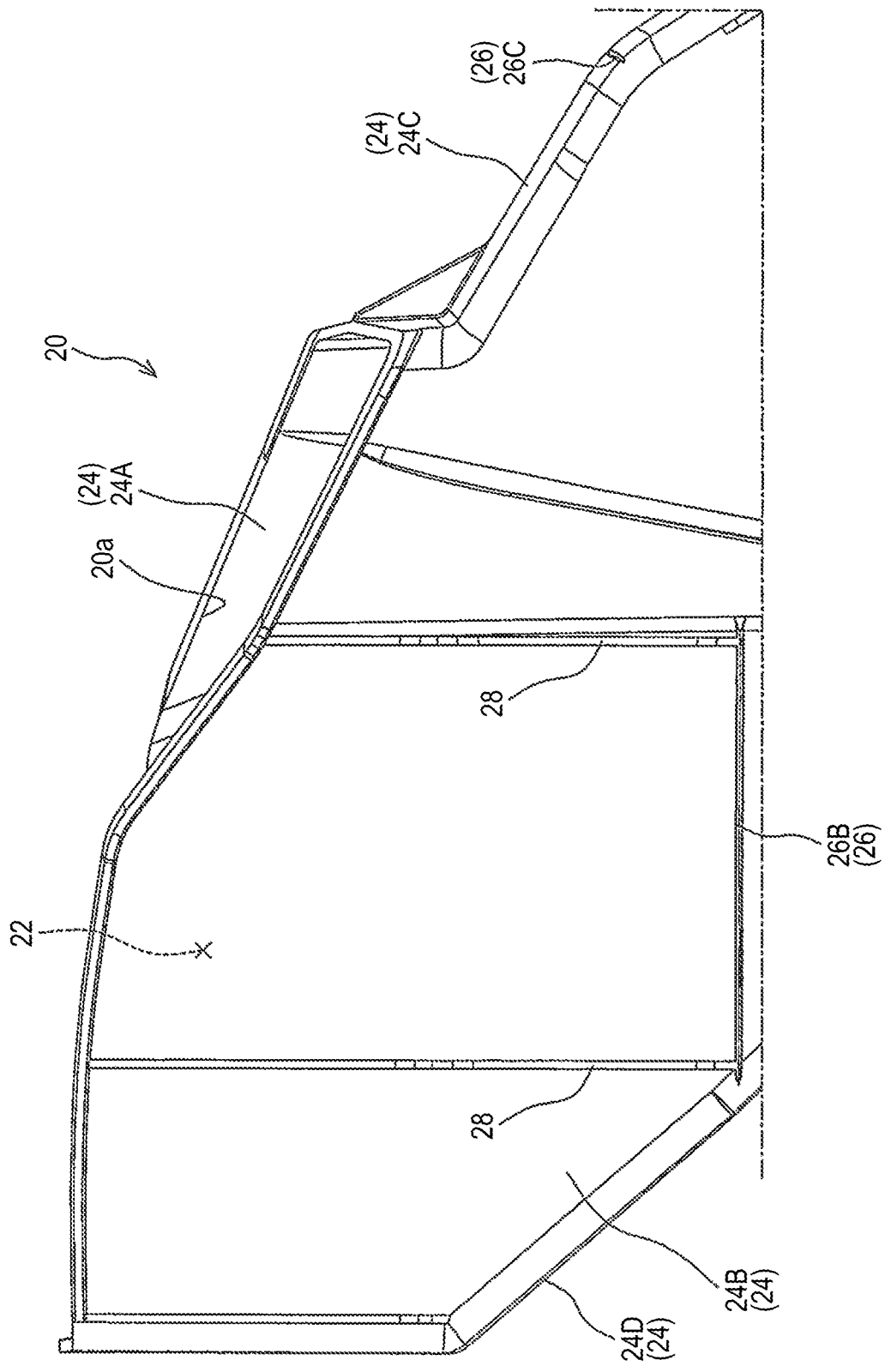
FIG. 7 is a bottom view of the duct according to the embodiment.

As shown in FIG. 5, in the duct 20, the groove portions 26 provided on the different faces of the wall portions 24 are shifted from each other in the air flow direction. Thus, the upper groove portion 26A, the lower groove portion 26B, and the left groove portion 26C are shifted from each other in the back/forth direction, and in the embodiment, the left groove portion 26C, the upper groove portion 26A, and the lower groove portion 26B are arranged in this order from front to rear.

Figure 8:
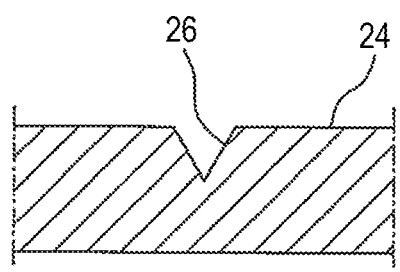
FIG. 8 is a sectional view of a groove portion according to the embodiment.

As shown in FIG. 8, the groove portions 26 have a concave shape so as to thin the wall portions 24. The groove portions 26 are provided so as to concave the outer surfaces of the wall portions 24 to open outward, and the inner surfaces abutting on the air flow path 22 in the wall portions 24 are flat. The groove portions 26 are shaped to become narrower on the bottom sides than on the opening sides, and in the embodiment, the groove portions 26 are shaped like a letter V. To provide the groove portions 26 on the outer surfaces of the wall portions 24 as described above is preferable, since it allows the duct 20 to be formed by mold formation with a simple mold structure, and air flow is not prevented in the air flow path 22.

As shown in FIG. 2 to FIG. 4, the upper wall portion 24A and the lower wall portion 24B include ribs 28 that are disposed closer to the air inlet 20a than the groove portions 26A and 26B and extend so as to cross the groove portions 26A and 26B. The ribs 28 are tabular pieces projecting from the outer surfaces of the wall portions 24, and extend in the back/forth direction between the air inlet 20a and the groove portions 26. The ribs 28 are formed so as to become gradually lower as they get closer to the air inlet 20a or the groove portions 26. It is to be noted that the ribs 28 provided on the lower wall portion 24B are discontinued on the way.

In the duct 20, by being provided with the groove portions 26, the upper wall portion 24A, the lower wall portion 24B, and the left wall portion 24C easily deform when an external force is applied from the side of the air inlet 20a. The duct 20 deforms so as to be collapsed rearward even if a pedestrian comes into collision with the front 14 of the vehicle 10, which allows an impact on the pedestrian to be reduced. In addition, since the duct 20 has a configuration that the groove portions 26 are independent from each other for every wall portion 24, and the groove portions 26 provided on the faces of the wall portions 24 which are continuous with each other, are not connected with each other, reduction in stiffness of the duct 20 can be suppressed. With this configuration, even if provided with the groove portions 26, the duct 20 can ensure a vibration durability against vibration during vehicle travelling and an internal pressure durability when water gets into the duct 20. Thus, according to the duct 20, pedestrian safety provided by the groove portions 26 at the time of crash and stiffness required at the normal use can be achieved at the same time.

In the duct 20, since the groove portions 26 provided on the different faces of the wall portions 24 are shifted from each other in the air flow direction, reduction in stiffness of the duct 20 caused by being provided with the groove portions 26 can be suppressed. Thus, by having the configuration that the formation positions of the groove portions 26 do not completely correspond with each other in the air flow direction, the duct 20 can ensure appropriate stiffness against forces other than the external force inputted from the front.

The ribs 28 extending so as to cross the groove portions 26A and 26B are provided on the upper wall portion 24A and the lower wall portion 24B on the side closer to the air inlet 20a than the groove portions 26A and 26B. The duct 20 can concentrate an external force exerted at the time of crash on the groove portions 26 with the use of the ribs 28 extending on the front sides of the groove portions 26, whereby appropriate deformation of the wall portions 24 can be generated at the groove portions 26 at the time of crash. The duct 20 has stiffness higher on the back side of the groove portions 26 so that a portion of the duct 20 on the front side of the groove portions 26 can be easily collapsed.

In the duct 20, the air outlet 22 that opens toward the rear of the vehicle is shifted in a right/left direction or an up/down direction of the vehicle with respect to the air inlet 20a that opens toward the front of the vehicle, and the groove portions 26 are provided to the wall portions 24A, 24B, and 24C other than the right wall portion 24D defining a face opposed to the air inlet 20a. The groove portion 26 is not provided on the right wall portion 24D. If the vehicle goes into a flooded road in heavy rain or the likes, and the water gets into the air flow path 22 from the air inlet 20a, the water flow would directly hit the right wall portion 24D opposed to the air inlet 20a; however, since the air outlet 22 is shifted in a right/left direction or an up/down direction of the vehicle with respect to the air inlet 20a and a groove portion 26 is not provided on the right wall portion 24D, the right wall portion 24D does not deform. Thus, the duct 20 has stiffness secured even in a case where water gets into the air flow path 22 when the vehicle travels on a flooded road.

(Modification)

The duct according to the present invention is not limited to the above-described configuration, and for example, may be modified as follows.

(1) The groove portions may be provided on all of the faces of the wall portions while the groove portions are provided on the three faces of the wall portions in the embodiment.

(2) The present invention is applicable to ducts installed in crash-relating sites such as a brake duct while an oil cooler duct is exemplified in the embodiment.

(3) The ribs may be formed so as to extend to the front side regions and the rear side regions sandwiching the groove portions while being discontinued at the groove portions.

REFERENCE SIGNS LIST

10: Vehicle; 20a Air inlet; 20b Air outlet; 22: Air flow path; 24: Wall portion; 24A: Upper wall portion; 24B: Lower wall portion; 24C: Left wall portion; 24D: Right wall portion; 26: Groove portion; 26A: Upper groove portion: 26B: Lower groove portion; 26C: Left groove portion; and 28: Rib.

What is claimed is:

1. A duct installed in a vehicle, the duct comprising:
    wall portions, each of which defines a corresponding one face of an air flow path leading, air from an air inlet to an air outlet; and
    groove portions, provided on at least two of the wall portions, respectively, and extending so as to cross an air flow direction of the air flow path, in which the at least two of the wall portions are continuous with each other,
    wherein the groove portions are independent from each other for every wall portion, and have a concave shape so as to thin the wall portions, and
    wherein the duct is installed between the air inlet provided in a bumper or a grill installed at a front of the vehicle and an oil cooler.

2. The duct according to claim 1, wherein the groove portions provided on different faces of the wall portions are shifted from each other in the air flow direction.

3. The duct according to claim 1, which further comprises a rib on the wall portion, wherein the rib is provided closer to the air inlet than the groove portions and extends so as to cross the groove portions.

4. The duct according to claim 1,
    wherein the air outlet that opens toward the rear of the vehicle is shifted in a right/left direction or an up/down direction of the vehicle with respect to the air inlet that opens toward the front of the vehicle, and
    wherein the groove portions are provided on the wall portions other than the wall portion that defines the face opposed to the air inlet.

* * * * *